(12) United States Patent
Hill

(10) Patent No.: US 6,264,186 B1
(45) Date of Patent: *Jul. 24, 2001

(54) TOP LOAD THREADED BOLT ASSEMBLY

(75) Inventor: Benny R. Hill, Fort Worth, TX (US)

(73) Assignee: Vought Aircraft Industries, Inc., Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/484,505

(22) Filed: Jan. 18, 2000

Related U.S. Application Data

(63) Continuation of application No. 08/853,958, filed on May 9, 1997, now Pat. No. 6,022,009.

(51) Int. Cl.⁷ ..................................... B23Q 1/00
(52) U.S. Cl. ................ 269/47; 269/289 R; 269/292; 269/297; 269/310
(58) Field of Search ................ 269/47, 289 R, 269/292, 297, 310, 312

(56) References Cited

U.S. PATENT DOCUMENTS 6,022,009 * 2/2000 Hill .................................. 269/47

* cited by examiner

*Primary Examiner*—Eileen P. Morgan
*Assistant Examiner*—Lee Wilson
(74) *Attorney, Agent, or Firm*—Baker Botts L.L.P.

(57) ABSTRACT

A top load threaded bolt assembly (60) for restraining a workpiece (36) on a operating surface (32) of a tooling fixture (50) is provided. Top load threaded bolt assembly (60) includes a housing (66) having a bolt cavity (75) and a bolt passage (76) disposed within housing (66). A bolt (64) having a first threaded portion (70) is disposed within bolt cavity (75) such that first threaded portion (70) extends above a operating surface (32) of tooling fixture (50). The top load threaded bolt assembly (60) may be disposed in the operating surface (32) of tooling fixture (50). Top load threaded bolt assembly (60) may further include a conical spring (62) to bias bolt (64) in an extended position. Bolt (64) may be secured in a non-extended position by threading a second threaded portion (72) into a threaded passage (58) which is adjacent bolt cavity (75) and opposite bolt passage (76).

31 Claims, 3 Drawing Sheets

TOP LOAD THREADED BOLT ASSEMBLY

CROSS REFERENCE TO RELATED APPLICATIONS

This appliation is a continuation of U.S. application Ser. No. 08/853,958, filed May 9, 1997, now U.S. Pat. No. 6,022,009 by Benny R. Hill and entitled "Top Load Threaded Bolt Assembly."

TECHNICAL FIELD OF THE INVENTION

This invention relates generally to tooling fixture restraining devices, and more particularly to a top load threaded bolt assembly for securing a workpiece to a tooling fixture for manufacturing operations.

BACKGROUND OF THE INVENTION

Numerous industries and applications use tooling fixtures to restrain a workpiece for manufacturing operations. Typical uses of tooling fixtures include securing and clamping raw stock to a machine for manufacturing operations, such as machining, milling, welding and other such manufacturing operations. In many cases the same tooling fixture is used throughout the various manufacturing operations. Tooling fixtures are also used on finished parts that are being assembled into subassemblies and final assemblies. Workpiece refers to the various parts that tooling fixtures restrain.

Existing methods to restrain a workpiece generally include clamping, bolting, or other forms of securing the workpiece to the operating surface of the tooling fixture. One such method uses bolts in which the threaded portion extends above the operating surface of the tooling fixture. These bolts reside in a cavity formed in the underside of the tooling fixture, and include a conical spring to bias the bolt in an extended position. A plug, accessible only from the underside of the tooling fixture, secures the bolt and spring in the cavity.

The workpiece to be secured typically includes threaded holes that align with the bolts extending from the tooling fixture. To secure the workpiece, a drive device engages a drive socket in the threaded portion of the bolt and rotates the bolt. The spring provides a biasing force to help the bolt engage the threaded hole in the workpiece. The drive device tightens the bolt, thereby securing the workpiece to the tooling fixture.

Existing bolt assemblies suffer from numerous disadvantages. One such disadvantage is that replacement of a damaged bolt requires removal of the tooling fixture/workpiece assembly from the machine or assembly tool to access the plug that secured the bolt in the cavity. This causes an interruption in the fabrication process, which may increase the time and cost to produce the finished product. In addition, replacement of damaged bolts may disturb the indexed orientation of the workpiece on the machine. In many cases, the workpiece will be scrapped due to the disruption. A further disadvantage with prior bolt assemblies is that unused bolts extend above the operating surface of the tooling fixture, thereby interfering with access to the workpiece and causing a safety hazard.

SUMMARY OF THE INVENTION

Accordingly, a need has arisen for an improved bolt assembly. The present invention provides a top load bolt assembly that addresses short-comings of prior bolt assemblies.

In accordance with the teachings of the present invention, an improved top load bolt assembly is provided.

A tooling fixture incorporating a top load bolt assembly for restraining a workpiece may include a base having an operating surface. At least one bolt cavity is disposed within the base. A bolt passage is disposed between the base operating surface and each bolt cavity. A bolt having a first threaded portion is movably disposed within the bolt cavity and the bolt passage to allow the first threaded portion to extend above the operating surface of the base and threadably restrain the workpiece. An access system is provided to install or replace the bolt from the base operating surface, thereby removing the need to remove the workpiece and tooling fixture from a machine.

Technical advantages of the present invention include providing a bolt assembly removable from the operating surface of the tooling fixture, thereby obviating the need to remove the workpiece and the tooling fixture from the machine. A damaged bolt can now be easily and quickly replaced without a substantial work stoppage and without the increased possibility of scrapping the workpiece. This is especially true with the tooling fixtures which include several hundred bolt assemblies which are heavy.

An additional technical advantage of the present invention is that the operator is no longer required to physically beat the plug out of the tooling fixture, thereby reducing the possibility of injury to both the operator and the expensive tooling fixture.

Another technical advantage of the present invention is that the bolt can be secured in a non-extended position to increase the access to the workpiece and to reduce the possibility of damage. In addition, with the removal of numerous bolts extended from the tooling fixture, the safety hazards of machine operators is reduced.

Other technical advantages will be readily apparent to one skilled in the art from the following figures, descriptions, and claims.

BRIEF DESCRIPTION OF THE DRAWINGS

For a more complete understanding of the present invention and for further features and advantages, reference is now made to the following description taken in conjunction with the accompanying drawings, in which.

DETAILED DESCRIPTION OF THE INVENTION

The preferred embodiments of the present invention and its advantages are best understood by referring in more detail to FIGS. 1–4 of the drawings, in which like numerals refer to like parts throughout the several views.

Figure 1:
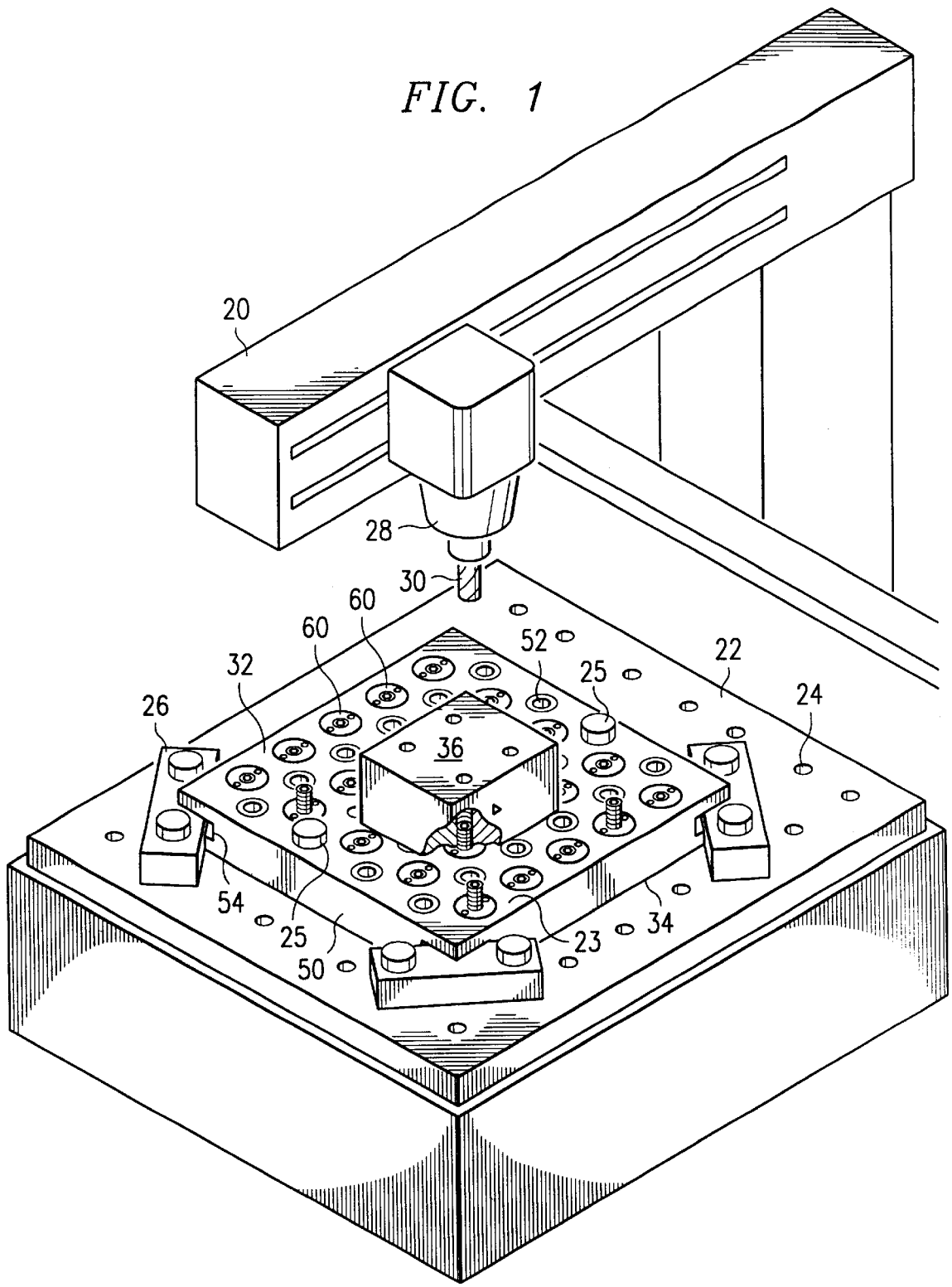
FIG. 1 is an orthographic drawing of a typical machining tool which includes a tooling fixture incorporating one embodiment of the present invention.

FIG. 1 illustrates a typical manufacturing milling machine 20 having a tool head 28 and mill cutter 30 for machining workpiece 36. Milling machine 20 includes machine bed 22 and bolt holes 24 for securing workpiece 36 and tooling fixture 50 to machine bed 22 at back surface 34. Tooling fixture 50 is provided with several features for securing tooling fixture 50 to machine bed 22. These features include clamp slot 54 in tooling fixture 50 in which clamps 26 are used to clamp tooling fixture 50 to machine bed 22. Tooling fixture 50 may also include bolt holes 52 in which bolts 25 are screwed into bolt holes 24 of machine bed 22 to secure tooling fixture 50 to machine bed 22.

Figure 2:
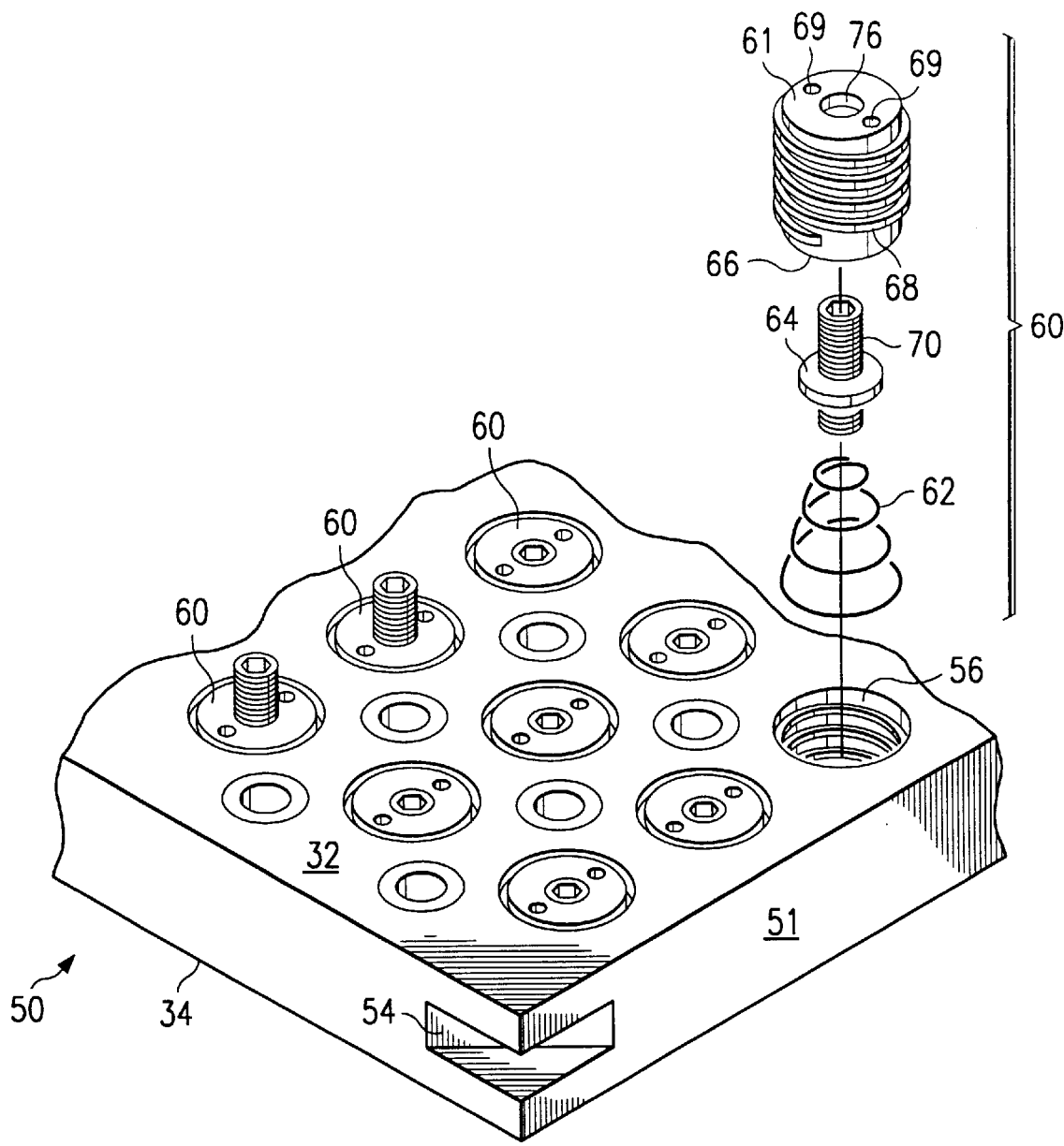
FIG. 2 is an exploded orthographic drawing in part of a tooling fixture according to one embodiment of the present invention.

FIG. 2 illustrates the components and assembly of tooling fixture 50. Tooling fixture 50 comprises bolt assembly 60 disposed within base 51. Bolt assembly 60 is shown in both the extended position (first threaded portion 70 of bolt 64 extended above operating surface 32 of tooling fixture 50) and the non-extended position (first threaded portion 70 of bolt 64 is even or below operating surface 32 of tooling fixture 50). Bolt assembly 60 may comprise housing 66, bolt 64, and conical spring 62. Housing 66 includes bolt passage 76 and assembly slots 69 located in first-end 61 of housing 66. The diameter of bolt passage 76 is related to the size of first threaded portion 70 of bolt 64. Threads 68 on the cylindrical surface of housing 66 may be left-handed threads and may be ACME threads for increased strength and ease of installation. A corresponding threaded cylindrical cavity 56 is disposed in base 51 for accepting housing 66.

Figure 3:
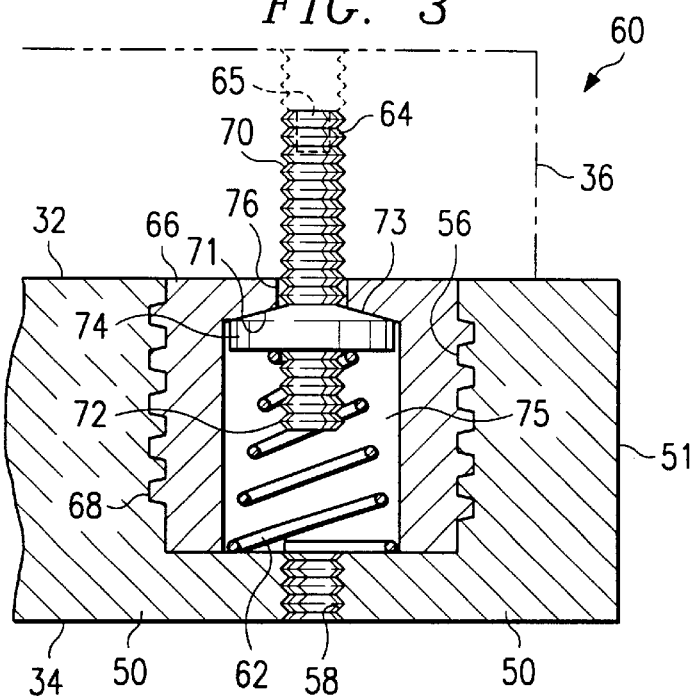
FIG. 3 is a schematic drawing in section with portions broken away of a tooling fixture according to one embodiment of the present invention.

FIG. 3 shows a cross section of an installed bolt assembly 60 in tooling fixture 50. Bolt cavity 75 is formed within housing 66. The diameter and length of bolt cavity 75 are related to the diameter of boss 74 and the length of bolt 64, respectfully. Housing 66 is threaded into threaded cylindrical cavity 56 until housing 66 bottoms onto base 51. Disposed within bolt cavity 75 is bolt 64 having first threaded portion 70, second threaded portion 72 and boss 74 disposed between first threaded portion 70 and second threaded portion 72. Conical spring 62 is disposed within bolt cavity 75 between boss 74 of bolt 64 and threaded passage 58 formed in base 51. Conical spring 62 acts on bolt 64 to bias bolt 64 in an extended position as shown in FIG. 3. To secure bolt 64 in a non-extended position, conical spring 62 is compressed and bolt 64 is rotated such that second threaded portion 72 of bolt 64 is threaded into threaded passage 58, thereby securing bolt 64 even or below the operating surface 32 of tooling fixture 50.

To secure workpiece 36 to operating surface 32 of tooling fixture 50, the required number and position of bolt assemblies 60 are extended. Workpiece 36 is placed on top of tooling fixture 50, compressing each bolt 64. The threaded bolt holes in workpiece 36 are aligned with the corresponding bolt 64. A drive device having an extension corresponding to drive socket 65 is used to rotate bolt 64. Conical spring 62 provides a biasing force on bolt 64 to extend bolt 64 into the threads of workpiece 36. Upon bolt 64 being tightened into workpiece 36, angled housing seat 73 contacts angled boss seat 71 to center bolt 64 and secure workpiece 36 to operating surface 32 of tooling fixture 50. Tooling fixture 50 can then easily be secured to machine bed 22 by use of clamps 26 or bolts 25.

Figure 4:
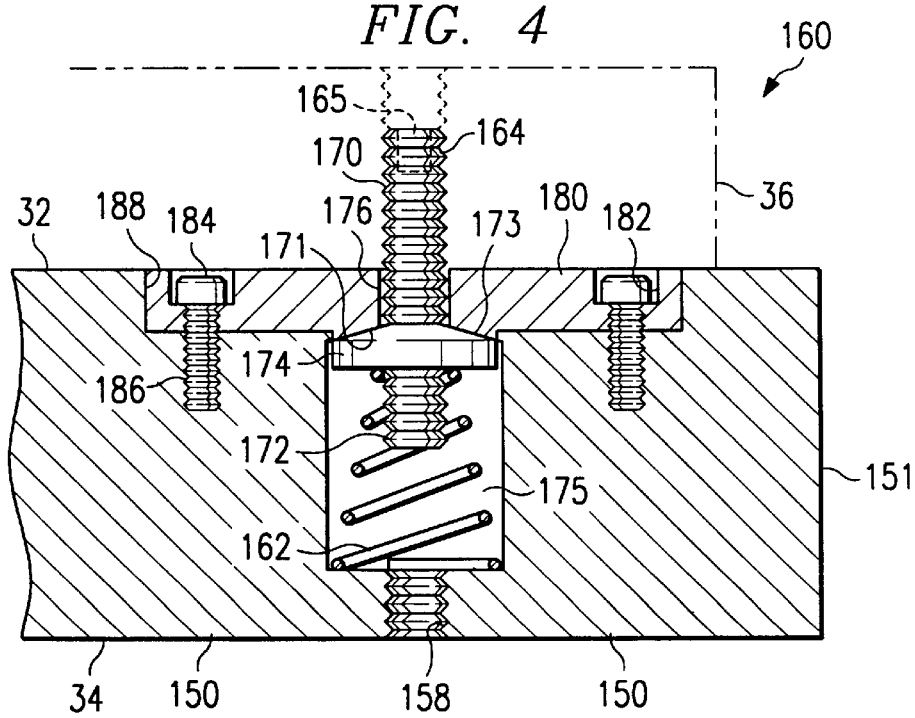
FIG. 4 is a schematic drawing in section with portions broken away of a tooling fixture according to another embodiment of the present invention.

FIG. 4 is a cross section of another embodiment of the present invention. Tooling fixture 150 comprises base 151 and bolt assembly 160 disposed within base 151. Bolt cavity 175 and recess 188 are formed in base 151. Disposed within recess 188 is plate 180 which is secured to base 151 using bolts 184 threaded into threaded bolt holes 186. Bolt recess 182 is formed in plate 180 to allow bolts 184 to be recessed at or below operating surface 32. Bolt passage 176 is formed in plate 180 between operating surface 32 and bolt cavity 175. Bolt 164 includes first threaded portion 170, second threaded portion 172, boss 174 disposed between first threaded portion 170 and second threaded portion 172, and drive socket 165 formed in the first threaded portion 170. Bolt 164 and spring 162 are disposed within bolt cavity 175. Spring 162 biases bolt 164 such that first threaded portion 170 extends through bolt passage 176 and above operating surface 32. Boss 174 includes seat 171 which contacts seat 173 formed in plate 180.

To secure bolt 164 in a non-extended position, conical spring 162 is compressed and bolt 164 is rotated such that second threaded portion 172 of bolt 164 is threaded into threaded passage 158, thereby securing bolt 164 at or below operating surface 32. The operation to secure workpiece 36 to operating surface 32 of tooling fixture 150 is similar to the earlier discussion.

Although the present invention and its advantages have been described in detail, it should be understood that various changes, substitutions, and alterations can be made therein without departing from the spirit and scope of the present invention as defined by the appended claims.

What is claimed is:

1. A bolt assembly for securing a workpiece to a tooling fixture, the tooling fixture having an internally threaded cavity and an operating surface, the bolt assembly comprising:
    a cylindrical housing having a first end and a second end, the cylindrical housing having externally formed threads to engage the internally threaded cavity and dispose the first end of the cylindrical housing proximate the operating surface;
    a bolt cavity formed within the cylindrical housing:
    a housing seat formed at the first end of the cylindrical housing;
    a bolt passage formed in the housing seat having a diameter less than a diameter of the bolt cavity;
    a bolt disposed within the bolt cavity of the cylindrical housing, the bolt having a threaded portion; and
    a bias system disposed below the housing seat and operable to bias the threaded portion of the bolt through the bolt passage and above the operating surface of the tooling fixture, the threaded portion extending above the operating surface to threadably restrain the workpiece.

2. The bolt assembly of claim 1, wherein the first end of the housing comprises a plurality of assembly slots to facilitate engagement of the externally formed threads of the cylindrical housing with the internally threaded cavity of the tooling fixture.

3. The bolt assembly of claim 1, wherein the bolt further comprises a boss, and wherein the bias system is operable to bias the threaded portion through the bolt passage until a surface of the boss engages a corresponding surface of the housing seat.

4. The bolt assembly of claim 1, wherein the bias system is disposed within the bolt cavity.

5. The bolt assembly of claim 1, wherein the bolt further comprises a drive socket formed in an end of the threaded portion extending above the operating surface, the drive socket operable to facilitate threaded engagement of the threaded portion with the workpiece.

6. The bolt assembly of claim 1, wherein the bolt further comprises a boss having an angled surface, and wherein the angled surface of the boss engages a corresponding angled surface of the housing seat to center the bolt within the bolt passage.

7. A bolt assembly for use in a tooling fixture having an operating surface, the bolt assembly comprising:
    a cylindrical housing having a first end and a second end, the first end of the cylindrical housing corresponding to the operating surface of the tooling fixture;

threads formed on an outer circumference of the cylindrical housing;

a bolt cavity formed within the cylindrical housing;

a housing seat formed at the first end of the cylindrical housing;

a bolt passage formed in the housing seat, the bolt passage having a diameter less than a diameter of the bolt cavity; and a bolt having a threaded portion and a boss, the boss having a diameter less than the diameter of the bolt cavity and greater than the diameter of the bolt passage, the bolt disposed within the bolt cavity such that the threaded portion of the bolt extends through the bolt passage until a surface of the boss engages a corresponding surface of the housing seat.

8. The bolt assembly of claim 7, wherein the surface of the boss comprises an angled surface, and wherein the angled surface of the boss engages a corresponding angled surface of the housing seat to center the threaded portion of the bolt within the bolt passage.

9. The bolt assembly of claim 7, further comprising a bias system disposed within the bolt cavity and operable to bias the threaded portion through the bolt cavity.

10. The bolt assembly of claim 9, wherein the bias system comprises a conical spring.

11. The bolt assembly of claim 7, wherein the first end of the housing comprises a plurality of assembly slots to facilitate rotation of the cylindrical housing to engage the threads formed on the outer circumference of the cylindrical housing with a threaded cavity formed in the tooling fixture.

12. The bolt assembly of claim 7, wherein the bolt further comprises a drive socket formed in an end of the threaded portion of the bolt extending through the bolt passage to facilitate rotation of the bolt.

13. A bolt assembly for use in a tooling fixture having an operating surface for a workpiece, comprising:

a housing having a first end and a second end, the first end corresponding to the operating surface of the tooling fixture;

a cavity disposed in the housing;

a bolt passage disposed between the cavity and the first end of the housing;

a bolt having a threaded portion; and a spring disposed in the cavity and operable to bias the threaded portion of the bolt through the bolt passage and above the operating surface of the tooling fixture, the threaded portion extending above the operating surface to secure the workpiece to the operating surface.

14. The assembly of claim 13, wherein the bolt further comprises a boss operable to engage a housing seat formed in the housing to limit extension of the threaded portion above the operating surface.

15. The assembly of claim 13, wherein the bolt further comprises a boss, the boss having an angled boss seat operable to engage an angled housing seat formed in the housing to center the bolt within the bolt passage.

16. The assembly of claim 13, wherein the housing comprises externally formed threads operable to engage an internally threaded cavity formed in the tooling fixture.

17. The assembly of claim 13, wherein the spring comprises a conical spring.

18. The assembly of claim 13, wherein the cavity extends from the bolt passage to the second end of the housing.

19. The assembly of claim 13, wherein the housing is configured having a length such that the second end of the housing engages a bottom of a cavity formed in the tooling fixture.

20. A bolt assembly for securing a workpiece to an operating surface of a tooling fixture, comprising:

a housing having a first end and a second end, the first end corresponding to the operating surface of the tooling fixture;

a cavity disposed in the housing;

a bolt passage disposed between the cavity and the first end, the bolt passage sized smaller than a size of the cavity, the cavity extending from the bolt passage to the second end of the housing;

a bolt having a threaded portion and a boss; and a spring disposed within the cavity and operable to contact the boss to bias the first threaded portion through the bolt passage and above the operating surface of the tooling fixture, the threaded portion extending above the operating surface to secure the workpiece to the operating surface.

21. The assembly of claim 20, wherein the boss comprises an angled boss seat operable to engage a corresponding angled housing seat of the housing to center the bolt within the bolt passage.

22. The assembly of claim 20, wherein the boss comprises a boss seat operable to engage a corresponding housing seat of the housing to limit the extension of the threaded portion above the operating surface.

23. The assembly of claim 20, wherein the housing comprises externally formed threads operable to engage corresponding internally formed threads of a cavity formed in the tooling fixture.

24. The assembly of claim 20, wherein the housing is configured having a length such that the second end of the housing contacts a bottom of a cavity formed in the tooling fixture.

25. A bolt assembly for securing a workpiece to an operating surface of a tooling fixture, comprising:

a housing having a first end and a second end, the first end corresponding to the operating surface of the tooling fixture;

a cavity disposed in the housing;

a bolt passage disposed between the cavity and the first end, the cavity extending from the bolt passage to the second end of the housing;

a bolt having a first threaded portion, a second threaded portion, and a boss disposed between the first and second threaded portions; and a spring disposed within the cavity and operable to bias the first threaded portion through the bolt passage and above the operating surface of the tooling fixture, the threaded portion extending above the operating surface to secure the workpiece to the operating surface.

26. The assembly of claim 25, wherein the boss comprises an angled seat operable to engage a corresponding angled seat of the housing to center the bolt within the bolt passage.

27. The assembly of claim 25, wherein engagement of the angled seat of the boss with the angled seat of the housing limits the extension of the first threaded portion above the operating surface.

28. The assembly of claim 25, wherein the second threaded portion is operable to engage a corresponding threaded passage of the tooling fixture to secure the bolt in a non-biased position.

29. The assembly of claim 25, wherein the housing comprises externally formed threads operable to engage corresponding internally formed threads of a cavity formed in the tooling fixture.

30. The assembly of claim 25, wherein the housing is configured having a length such that the second end engages a bottom of a cavity formed in the tooling fixture.

31. The assembly of claim 25, wherein the boss is operable to move downwardly within the cavity in a non-biased position to position the first threaded portion below the operating surface.

* * * * *